United States Patent [19]

Loza et al.

[11] Patent Number: 4,853,138
[45] Date of Patent: Aug. 1, 1989

[54] C-BRANCHED ZWITTERIONIC SURFACTANTS AND ENHANCED OIL RECOVERY METHOD USING SAME

[75] Inventors: Roman Loza, Solon; Roseann M. Cyngier, Cleveland, both of Ohio

[73] Assignee: The Standard Oil Company

[21] Appl. No.: 81,824

[22] Filed: Aug. 5, 1987

[51] Int. Cl.$^4$ ............................................. E21B 43/22
[52] U.S. Cl. .................................. 252/8.554; 166/273; 562/107
[58] Field of Search .............. 252/8.554; 260/501.12; 166/273

[56] References Cited

U.S. PATENT DOCUMENTS

| | | | |
|---|---|---|---|
| 3,227,749 | 1/1966 | Cambre et al. | 260/501 |
| 3,280,179 | 10/1966 | Ernst | 260/501 |
| 3,372,749 | 3/1968 | Williams | 252/8.554 X |
| 3,539,521 | 11/1970 | Snoddy et al. | 252/137 |
| 4,004,638 | 1/1977 | Burdyn et al. | 166/273 |
| 4,193,452 | 3/1980 | Wilson et al. | 166/274 |
| 4,216,097 | 8/1980 | Stournas | 252/8.554 |
| 4,238,350 | 12/1980 | Larsen et al. | 252/392 |
| 4,370,243 | 1/1983 | Chen et al. | 252/8.55 D |
| 4,468,335 | 8/1984 | Chen et al. | 252/8.55 X |
| 4,479,894 | 10/1984 | Chen et al. | 252/8.55 D |
| 4,502,540 | 3/1985 | Byham | 166/274 |
| 4,554,974 | 11/1985 | Kalpakci et al. | 252/8.554 X |

*Primary Examiner*—John F. Terapane
*Assistant Examiner*—Gary Geist
*Attorney, Agent, or Firm*—Larry W. Evans; Joseph G. Curatolo; Teresan W. Gilbert

[57] ABSTRACT

A C-branched zwitterionic surfactant represented by the following formula is disclosed:

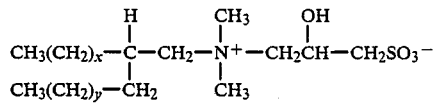

wherein x and y are numbers, x is less than or equal to y+1, and the sum of x+y is in the range of about 7 to about 19, with the provisos that: (1) when the sum of x+y is in the range of about 7 to about 13, x/y is in the range of about 0.3 to about 1.2; and (2) when the sum of x+y is in the range of about 14 to about 19, x/y is in the range of about 0.1 to about 0.7. An enhanced oil recovery method using the foregoing surfactants is also disclosed.

15 Claims, No Drawings

C-BRANCHED ZWITTERIONIC SURFACTANTS AND ENHANCED OIL RECOVERY METHOD USING SAME

TECHNICAL FIELD

This invention relates to novel C-branched zwitterionic surfactants and to enhanced oil recovery methods using these surfactants. More particularly, this invention relates to novel 3-(alkyldimethylammonio)-2-hydroxy-1-propane sulfonates wherein the alkyl group is C-branched, and the use of these sulfonates in enhanced oil recovery.

BACKGROUND OF THE INVENTION

In the recovery of oil from oil-bearing reservoirs, it usually is possible to recover only minor portions of the original oil in place by the so-called primary recovery methods which utilize only the natural forces present in the reservoir. A variety of supplemental techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected-water, and the wettability characteristics of the rock surfaces within the reservoir are factors which influence the amount of oil recovered by waterflooding. It has been proposed to add surfactants to the flood water in order to lower the oilwater interfacial tension and/or to alter the wettability characteristics of the reservoir rock. Processes which involve the injection of aqueous surfactant solutions are commonly referred to as surfactant waterflooding or as low tension waterflooding, the latter term having reference to the mechanism involving the reduction of the oil-water interfacial tension. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Problems with stability and effectiveness have arisen when surfactants and thickeners have been used in relatively harsh environments such as those characterized by temperatures in the range of about 15° C. to about 120° C. and above, high pressures (e.g., up to about 4000 psi), high concentrations of divalent metal ions such as calcium, magnesium, etc. (e.g., up to 3000 ppm or more and in some instances as high as 10,000 or 20,000 ppm), and high salinity (e.g., total dissolved salts (TDS) levels of up to about 200,000 ppm).

The use of certain anionic surfactants for waterflooding have been suggested. For example, a paper by W. R. Foster Entitled "A Low-Tension Waterflooding Process", Journal of Petroleum Technology, Vol. 25, Feb. 1973, pp. 205–210, describes a technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer. This thickened water slug is then followed by a driving fluid such as a field brine which is injected as necessary to carry the process to conclusion. One problem encountered in waterflooding with anionic surfactants such as petroleum sulfonates is the lack of stability of these surfactants in so-called "hard water" environments. These surfactants tend to precipitate from solution in the presence of relatively low concentrations of divalent metal ions such as calcium and magnesium ions. For example, divalent metal ion concentrations of about 50 to about 100 ppm and above often tend to cause precipitation of the petroleum sulfonates.

Nonionic surfactants, such as polyethyoxylated alkyl phenols, polyethoxylated aliphatic alcohols, carboxylic esters, carboxylic amides, and polyoxyethylene fatty acid amides, have a somewhat higher tolerance of polyvalent ions such as calcium or magnesium than do the petroleum sulfonates. However, while it is technically feasible to employ a nonionic surfactant solution to decrease the interfacial tension between the injected aqueous displacing medium and petroleum contained in some limestone formations, such use is generally not economically feasible for several reasons. Nonionic surfactantts are not as effective on a per mole basis as are the more commonly used anionic surfactants and, additionally, the nonionic surfactants generally have a higher cost per unit weight than do the anionic surfactants. The polyethoxylated alkyl phenol nonionic surfactants usually exhibit a reverse solubility relationship with temperature and become insoluble at temperatures above their cloud points; making them ineffective in many oil formations. Nonionic surfactants that remain soluble at elevated temperatures are generally not effective in reducing interfacial tension. Other types of nonionic surfactants hydrolyze at temperatures above about 75° C.

The use of certain combinations of anionic and nonionic surfactant to combat hard water formations has been suggested. For example, U.S. Pat. No. 3,811,504 discloses the use of three component mixture including an alkyl or alkylaryl sulfonate, an alkyl polyethoxy sulfate and a polyethoxylated alkyl phenol. U.S. Pat. No. 3,811,505 discloses the use of alkyl or alkylaryl sulfonates or phosphates and polyethoxylated alkyl phenols. U.S. Pat. No. 3,811,507 discloses the use of a water-soluble salt of a linear alkyl or alkylaryl sulfonate and a polyethoxylated alkyl sulfate.

Cationic surfactants such as quaternary ammonium salts, and derivatives of fatty amines and polyamines, have also been suggested. However, these compounds have the disadvantage of substantivity or attraction, especially towards silicate rock, and they lose their activity by adsorption.

The use of certain amphoteric surfactants which function as cationics in acid media and become anionic when incorporated in alkaline systems has been suggested. For example, U.S. Pat. No. 3,939,911 discloses a surfactant waterflooding process employing a three-component surfactant system. This surfactant system includes an alkyl or alkylaryl sulfonate such as an ammonium dodecyl benzene sulfonate, a phosphate ester sulfonate, and a sulfonated betaine such as a $C_{12}$–$C_{24}$ alkylamide $C_1$–$C_5$ alkane dimethylammonium propane sulfonate.

Ether sulfonates of the general formula $$R\text{---}(OCH_2CH_2)_n\text{---}SO_3^-Na^+$$

have been found to be effective surfactants for enhanced oil recovery. These surfactants have acceptable levels of tolerance with respect to divalent metal ions. However, these surfactants have thus far been found to be too costly for use in enhanced oil recovery.

The use of zwitterionic surfactants of the general formula

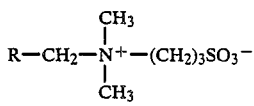

in enhanced oil recovery is disclosed in U.S. Pat. Nos. 4,216,097; 4,370,243; 4,479,894; 4,502,540; and 4,554,974. These surfactants are prepared by reacting alkyldimethylamines with 1,3-propane sultone. Propane sultone is a known carcinogen and is quite costly. Surfactants derived from propane sultone have thus far been found to be too costly for enhanced oil recovery. These surfactants also typically require the use of a cosurfactant such as alcohol to obtain desirable interfacial tension (IFT) levels. The addition of alcohol is not desirable from both a performance point of view and an economic point of view. In the reservoir, the alcohol can separate from the surfactant which leads to lower oil recovery, and the addition of alcohol adds to the overall cost.

Zwitterionic surfactants of the general formula

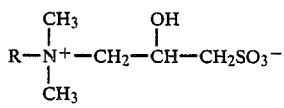

are disclosed in U.S. Pat. Nos. 3,227,749 and 3,539,521 as being useful as surfactants for incorporation into soaps, detergents and other toilet articles. In U.S. Pat. No. 3,227,749, R is defined as an alkyl chain of about 14 to about 18 carbon atoms. In U.S. Pat. No. 3,539,521, R is defined as an alkyl radical having about 12 to about 18 carbon atoms.

The use of thickening agents to increase the viscosity of injected water, normally to a value of at least equal to that of the reservoir oil, in order to arrive at a favorable mobility ratio between the oil and water and increase the macroscopic displacement efficiency of waterflood is known. Examples of such thickeners or mobility control agents are Polysaccharide B-1459, which is available from Kelco Company under the tradename "Kelzan", and the partially hydrolyzed polyacrylamides available from the Dow Chemical Company under the tradename "Pusher" chemicals. The homopolysaccharide gum thickeners such as those available from CECA S.A. under the tradename Actigum CS 11 L have also been reported as being useful.

While many surfactants and waterflooding methods have been proposed, there is a substantial, unfulfilled need for a surfactant and waterflooding method that is useful in recovering oil from subterranean formations wherein the surfactant is exposed to high temperatures, high salinities, high pressures, and high concentrations of divalent metal ions.

SUMMARY OF THE INVENTION

The present invention provides for novel C-branched zwitterionic surfactants represented by the formula:

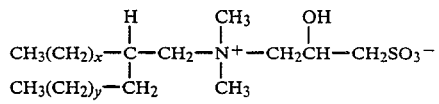

wherein x and y are numbers and the sum of x+y is in the range of about 7 to about 19 and x is less than or equal to y+1, with the provisos that: (1) when the sum of x+y is in the range of about 7 to about 13, x/y is in the range of about 0.3 to about 1.2; and (2) when the sum of x+y is in the range of about 14 to about 19, x/y is in the range of about 0.1 to about 0.7. The invention further provides for an enhanced oil recovery method using the foregoing surfactants.

DESCRIPTION OF THE PREFERRED EMBODIMENTS

Zwitterionic Surfactants

The zwitterionic surfactants of the present invention can be represented by the formula:

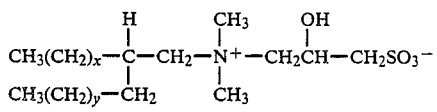

wherein x and y are numbers, x is less than or equal to y+1, and the sum of x+y is in the range of about 7 to about 19, preferably about 9 to about 17, with the provisos that: (1) when the sum of x+y is in the range of about 9 to about 13, x/y is in the range of about 0.3 to about 1.2, preferably about 0.5 to about 0.9; and (2) when the sum of x+y is in the range of about 14 to about 19, x/y is in the range of about 0.1 to about 0.7, preferably about 0.2 to about 0.5. x is a number in the range of about 1 to about 8, preferably about 3 to about 6. y is a number in the range of about 4 to about 17, preferably about 4 to about 12. 3-[N,Ndimethyl-(2-butyl)hexadecyl ammonio]-2-hydroxy-1-propane sulfonate and 3-[N,N dimethyl-(2-hexyl)tetradecyl ammonio]-2-hydroxy-1-propane sulfonate are particularly preferred.

The synthesis of these surfactants can be divided into two stages. In the first stage, amines of the general formula

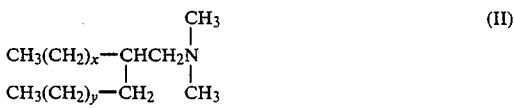

are prepared by converting a carboxylic acid of the formula

to an acid chloride of the formula

The conversion of the carboxylic acid to the acid chloride can be effected by reacting the carboxylic acid with $SOCl_2$. The acid chloride is then reacted with dimethylamine, $HN(CH_3)_2$, to provide an amide of the formula

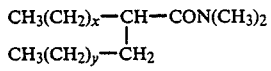

The amide (V) is then reduced using lithium aluminum hydride to provide the amine (II).

In the second stage, the amine (II) is reacted with 3-chloro-2-hydroxy-1-propane sulfonate using a mixture of water, isopropanol as a solvent and sodium hydroxide as a catalyst to provide the desired zwitterionic surfactant.

The following example is provided for the purpose of further illustrating the preparation of the zwitterionic surfactants of the invention. Unless otherwise indicated, in the following example as well as throughout the specification and in the claims, all parts and percentages are by weight, and all temperatures are in degrees centigrade.

EXAMPLE 1

3-[N,N-dimethyl-(2-butyl)hexadecylammonio]-2-hydroxy-1-propanesulfonate

A 250-mL round bottom flask was charged with 31.2 g (0.01 mol) of 5-nonadecane carboxylic acid and 15 mL (0.21 mol) of thionyl chloride. The mixture was stirred at room temperature overnight. In the morning, the mixture was sampled and examined by infrared (ir) spectroscopy. The absence of a carboxylic acid carbonyl strech in the ir indicated that the reaction was complete. Excess thionyl chloride was removed under reduced pressure to give crude acid chloride. The acid chloride was condensed with dimethylamine.

A 1-L 3-neck round bottom flask was cooled in dry ice/acetone bath and 20 g (0.4 mol) of anhydrous dimethylamine were condensed in the flask. Then 300 mL of anhydrous ether were added and the mixture was allowed to warm to 0° C. A solution of acid chloride in 50 mL of ether was added, with stirring, at 0° C. (ice/water bath). After addition was complete, the mixture was allowed to warm to room temperature and stirred for 1 hr. The mixture was filtered to remove precipitated salt and activated carbon was added. Then the mixture was filtered again through activated alumina. The ether was removed under reduced pressure to give 33.0 g (97%) of a yellow oil identified as 5-nonadecane carboxylic acid N,N-dimethylamide on the basis of its nmr spectrum.

A 1-L 3-neck round bottom flask (equipped with magnetic stirrer, reflux condenser, and a nitrogen atmosphere) was charged with 3.7 g (100 mmol) of lithium aluminum hydride and 250 mL of anhydrous ether. To the stirred suspension was added dropwise a solution containing 33 g. (100 mmol) of crude 5-nonadecane carboxylic acid N,N-dimethylamide in 150 mL of ether. The mixture was refluxed for 11 hours, cooled and the reaction was quenched by adding slowly 3.7 mL of water, 3.7 mL of a 15% sodium hydroxide solution, and 11.1 mL of water. The resulting precipitate was removed by filtration and the ether was evaporated to give 27.4 g of a yellow oil which was distilled under vacuum (b.p. 148–9° C. at 0.11 mm Hg) to give 20.9 g (64%) of a clear liquid identified as N,N-dimethyl-(2-butyl)hexadecylamine on the basis of its nmr spectrum.

A 1-L round bottom flask (equipped with a magnetic stirrer and reflux condenser) was charged with 20 g (61 mmol) of N,N-dimethyl-(2-butyl)hexadecylamine, 20 g (100 mmol) of sodium 3-chloro-2-hydroxy-1-propane-sulfonate, 140 mL isopropanol, 50 mL of water, and 0.6 g (8 mmol) of 50% sodium hydroxide. The mixture was stirred at reflux. The progress of the reaction was followed using a Waters Associates C-18 μ-Bondapak reverse-phase column, 1.5 mL/min of a 10:1 isopropanol:water as solvent and a refractive index detector. Total reflux time was 56 hours. The reaction mixture was extracted with chloroform (200 mL). The organic layer was concentrated in vacuum to give a white solid which was taken up in 600 mL of a 1:1 isopropanol:water mixture and washed with petroleum ether (2 times using 200 mL of petroleum ether).

The petroleum ether layers were combined and the solvent was removed under reduced pressure to give a viscous oil which solidified on standing. This solid was triturated with cold petroleum ether (3 times using 50 mL of petroleum ether) to give, after drying, 9.2 g of a white solid which analyzed to be 94% pure 3-[N,N-dimethyl-(2-butyl)hexadecylammonio]-2-hydroxyl-1-propane sulfonate.

Enhanced Oil Recovery

The zwitterionic surfactants of the invention are preferably present in the aqueous compositions used in accordance with the enhanced oil recovery method of the invention in minor surface-active amounts (that is, effective amounts to reduce the oil-water interfacial tension and/or alter the wettability characteristics of the reservoir rock), preferably at a concentration in the range of from about 0.01% to about 6% by weight, more preferably about 0.1% to about 3% by weight of said aqueous composition.

The method of the present invention may be carried out utilizing injection and production systems as defined by any suitable arrangement of wells. One well arrangement commonly used in waterflooding operations and suitable for use in carrying out the method of the present invention is an integrated five-spot pattern of the type illustrated in U.S. Pat. No. 3,927,716, which is incorporated herein by reference. Other well arrangements used in the art may also be used in carrying out the present invention.

The term "pore volume" is used herein to mean that volume of the portion of the formation underlying the well pattern employed, as described in greater detail in U.S. Pat. No. 3,927,716.

The aqueous composition that is injected in accordance with the inventive method can be referred to as a surfactant slug. In a typical operation, the surfactant slug is injected into the formation through one or more injection wells using standard techniques known in the art, then a buffer slug is injected, and finally an aqueous flooding medium is injected after the buffer slug to drive the oil toward one or more production wells. The surfactant slug typically has a lower viscosity than the buffer slug, and contains an effective amount of surfactant to reduce the oil-water interfacial tension and/or alter the wettability characteristics of the reservoir rock. The surfactant slug can contain a thickener; the concentration of thickener preferably being in the range of up to about 1% by weight, preferably from about 0.055 to about 0.2% by weight. The buffer slug contains an effective amount of a thickener to increase the viscosity of the buffer slug to a level above that of the surfactant slug, and thereby decrease the mobility ratio between the injected water and the oil in the formation.

The size of the surfactant slug preferably ranges from about 0.2 to about 3 pore volumes. The concentration of zwitterionic surfactants of the invention in the surfactant slug is preferably adjusted in accordance with the size of the slug. Thus, a surfactant slug with a pore volume of about 0.2 preferably has a surfactant concentration of about 1% to about 2% by weight. A surfactant slug with a pore volume of about 1 preferably has a surfactant concentration of about 0.1% to about 1% by weight. A surfactant slug with a pore volume of about 2 preferably has a surfactant concentration of about 0.05% to about 0.5% by weight.

The buffer slug can employ any thickening agent that is stable under the anticipated operating conditions. The thickening agent is employed at an effective level to increase the viscosity of the buffer slug to a value in excess of the viscosity of the surfactant slug to provide an enhanced mobility ratio between the buffer slug and the surfactant slug and thereby increase the macroscopic displacement efficiency of the water-flood. Examples of thickeners that are useful under various circumstances include Polysaccharide B-1459 available from Kelco Company under the tradename "Kelzan", and the partially hydrolyzed polyacylamides available from the Dow Chemical Company under the tradename "Pusher" chemicals.

A class of thickeners that is useful includes the homopolysaccharide gum thickeners. These thickeners are typically nonionic and have a molecular weight that is greater than about one million, preferably in the range of about 1 to about 3.5 million, and are represented by the formula

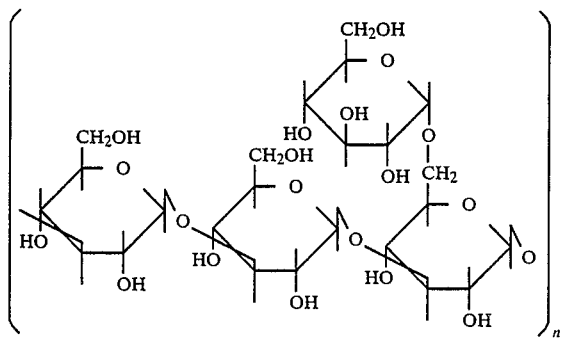

wherein n is a number that is high enough to provide the desired molecular weight. The polymer structure can be a linear chain of anhydroglucose units linked beta (1–3). About 30 to about 35% of the linear chain units preferably bear single appended anhydroglucose units linked beta (1–6). This thickener is preferably cell-free and produced by selected fungus strains of the genus Schlerotium in a pure culture fermentation. An example of a commercially available thickener that is suitable for use in accordance with the method of the present invention is Actigum CS 11 L, a product of CECA S.A., which is identified as a solution of a water-soluble gum "Scleroglucan".

The buffer slug employed in accordance with the invention preferably has a thickener concentration of about 0.05% to about 0.2% by weight, more preferably about 0.05 to about 0.1% by weight. Preferably, the concentration of thickener in the buffer slug is at least about 0.02% by weight higher than the concentration of thickener in the surfactant slug. The higher concentration of thickener in the buffer slug in relation to concentration of thickener, if any, in the surfactant slug is essential to the effective operation of the method of the present invention to insure proper control of the relative mobilities of the surfactant slug and the buffer slug. The buffer slug preferably has a pore volume in the range of about 0.6 to about 3.

The drive fluid or aqueous flooding medium is injected into the reservoir in sequential order after the surfactant slug and buffer slug. This flooding medium is preferably water and can be any source of water, such as sea water, that is readily available.

An advantage of the method of the present invention is that it can be practiced in subterranean formations having temperatures ranging up to about 300° C., preferably in the range of about 15° C. to about 120° C. and high pressures (e.g., up to about 4000 psi). The flood water can have a high salinity (e.g., TDS values as high as about 200,000 ppm such as when the floodwater is sea water), and high concentrations of divalent metal ions (e.g., up to about 3000 ppm or more and in some instances as high as about 10,000 ppm or about 20,000 ppm). These conditions are typically encountered under various circumstances at Prudhoe Bay, the North Sea, the Persian Gulf, the Gulf of Mexico, as well as other major oil fields. A particularly significant advantage of the inventive method is that the zwitterionic surfactant of the invention are relatively inexpensive when compared to analogous surfactants derived from propane sultone; use of the inventive zwitterionic in enhanced oil recovery can be economically advantageous.

The following examples are provided for the purpose of illustrating the effectiveness of the enhanced oil recovery method of the invention. In these examples Interfacial Tension (IFT) measurements using a spinning drop tensiometer were made using surfactants of the formula:

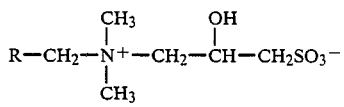

The surfactants that were tested are designed as I, II, C-I, C-II, C-III and C-IV below. For surfactants I, II, C-I and C-II, R had the formula

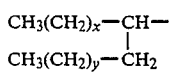

where x and y for each surfactant were as follows:

| Surfactant | x | y |
|---|---|---|
| I | 3 | 12 |
| II | 5 | 10 |
| C-I | 1 | 14 |
| C-II | 7 | 8 |

For surfactants C-III, and C-IV, R had the formula

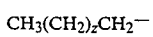

wherein z for each surfactant was as follows:

| Surfactant | z |
|---|---|
| C-III | 13 |

-continued

| Surfactant | z |
|---|---|
| C-IV | 17/19 |

Surfactants I and II are illustrative of the invention. Surfactants C-I to C-IV were tested for purposes of comparison. The preparation of surfactant I is described in Example 1. Surfactants II, C-I and C-II were prepared using the procedure described in Example 1 using appropriate starting materials. Surfactants C-III and C-IV were prepared from commercial alkyldimethylamines.

EXAMPLE 2

IFT measurements were made with 10% NaCl brines containing 1% by weight surfactant at 60° C. in octane (live crude oil model) and dodecane (dead crude oil model). The results are provided in Table 1. Numerical values in Table 1 are the IFT measurements in dyne/cm.

TABLE 1

| Surfactant | Octane | Dodecane |
|---|---|---|
| I | 0.057 | 0.22 |
| II | 0.11 | 0.018 |
| C-I | 0.60 | 0.16 |
| C-II | 0.83 | 0.64 |
| C-III | 2.2 | 2.5 |
| C-IV | 0.82 | 0.66 |

These results indicate that surfactants I and II are suitable for use in enhanced oil recovery. These results also indicate that the C-branched zwitterionic surfactants of the invention (i.e., surfactants I and II) provide significant improvements in decreasing hydrocarbon/brine interfacial tension over their linear analogs (i.e., surfactants C-III and C-IV) as well as their highly branched analogs (i.e., surfactant C-II) and less branched analogs (i.e., surfactant C-I).

EXAMPLE 3

In a chemical flood, local changes in brine concentration and oil composition can cause increases in IFT values which can decrease oil recovery efficiency. To determine the sensitivity of zwitterionic surfactants of the invention to these two variables, IFT values for surfactants I and II were measured in several brines and hydrocarbons. The concentration of surfactant in each brine was 1.0% by weight. The results of these experiments are shown in Tables 2 and 3. The numerical values in Tables 2 and 3 are the IFT values in dynes/cm that were measured. The data in Table 2 is for surfactant I while the data in Table 3 is for surfactant II.

TABLE 2

| | Surfactant I | | |
|---|---|---|---|
| | Hydrocarbon | | |
| Brine | Octane | Dodecane | Hexadecane |
| 2.0% NaCl | 0.058 | 0.21 | 0.53 |
| 5.0% NaCl | 0.069 | 0.22 | 0.44 |
| 10.0% NaCl | 0.057 | 0.22 | 0.44 |
| Seawater | 0.051 | 0.22 | 0.43 |

TABLE 3

| | Surfactant II | | |
|---|---|---|---|
| | Hydrocarbon | | |
| Brine | Octane | Dodecane | Hexadecane |
| 2.0% NaCl | 0.081 | 0.032 | 0.058 |
| 5.0% NaCl | 0.086 | 0.028 | 0.037 |
| 10.0% NaCl | 0.11 | 0.018 | 0.032 |
| Seawater | 0.097 | 0.038 | 0.058 |

The foregoing indicates that relatively large changes in salinity have little effect on the IFT values that were found using surfactants I and II. Surfactant I was most effective in octane, while surfactant II was most effective in dodecane.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A method of recovering oil from a subterranean formation comprising injecting an aqueous composition into said formation and displacing said oil toward one or more production wells, said aqueous composition comprising a surface-active amount of at least one compound of the formula

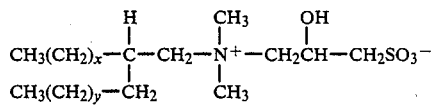

wherein x is in the range of about 3 to about 5 and y is in the range of about 10 to about 12, x is less than or equal to y+1, and the sum of x+y is in the range of about 7 to about 19, with the provisos that: (1) when the sum of x+y is in the range of about 7 to about 13, x/y is in the range of about 0.3 to about 1.2; and (2) when the sum of x+y is in the range of about 14 to about 19, x/y is in the range of about 0.1 to about 0.7.

2. The method of claim 1 wherein x is about 3 and y is about 12.

3. The method of claim 1 wherein x is about 5 and y is about 10.

4. The method of claim 1 wherein said aqueous composition comprises a surfactant slug, said surfactant slug being injected into said formation through one or more injection wells, said method further comprising the steps of:

injecting into said formation through said injection wells a buffer slug to follow said surfactant slug, said buffer slug comprising an aqueous solution containing an effective amount of at least one thickener to provide said buffer slug with a viscosity exceeding the viscosity of said surfactant slug, then injecting into said formation through said injection wells an aqueous flooding medium to displace the oil toward said production wells.

5. The method of claim 1 wherein said compound is present in said aqueous composition at a concentration in the range of about 0.01% to about 6% by weight.

6. The method of claim 1 wherein the average temperature of the oil in said formation is in the range of about 15° C. to about 120° C.

7. The method of claim 1 wherein the water in said aqueous composition has a TDS of up to about 200,000 ppm.

8. The method of claim 1 wherein said aqueous composition has a divalent metal ion concentration of up to about 20,000 ppm.

9. The method of claim 1 wherein the pressure within said formation ranges up to about 4000 psi.

10. The method of claim 1 wherein the amount of said aqueous composition injected into said formation is in the range of about 0.2 to about 3 pore volumes.

11. The method of claim 4 wherein the amount of said buffer slug injected into said formation is in the range of about 0.6 to about 3 pore volumes.

12. The method of claim 4 wherein said surfactant slug contains up to about 1% by weight of at least one thickener.

13. The method of claim 12 wherein the concentration of said thickener in said buffer slug is from about 0.05% to about 0.2% by weight.

14. The method of claim 4 wherein said thickener is a homopolysaccharide gum thickener represented by the formula

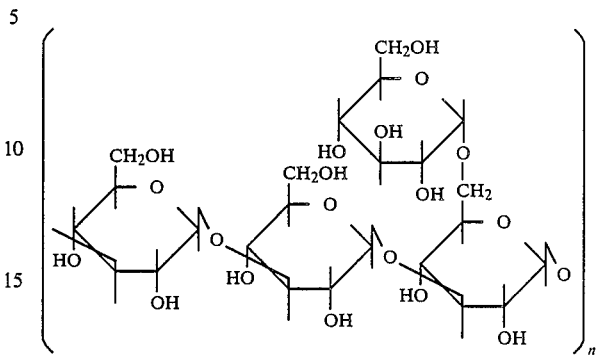

wherein n is a number that is high enough to provide a molecular weight of at least about one million.

15. The method of claim 1 wherein the water in said aqueous composition comprises sea water.

* * * * *